United States Patent [19]

Botnick

[11] Patent Number: 4,557,288
[45] Date of Patent: Dec. 10, 1985

[54] CLOSURE-ASSISTED CARTRIDGE-TYPE FLOW CONTROL VALVE

[75] Inventor: Irlin H. Botnick, Pepper Pike, Ohio

[73] Assignee: Josam Developments, Inc., Cleveland, Ohio

[21] Appl. No.: 408,448

[22] Filed: Aug. 16, 1982

Related U.S. Application Data

[63] Continuation-in-part of Ser. No. 286,949, Jul. 27, 1981, abandoned, which is a continuation of Ser. No. 52,976, Jun. 28, 1979, abandoned.

[51] Int. Cl.$^4$ ............................................. F16K 43/00
[52] U.S. Cl. .................................. 137/315; 137/454.6; 137/454.5; 251/82; 251/175; 251/252
[58] Field of Search .................. 251/175, 252, 82; 137/454.5, 454.6, 315

[56] References Cited

U.S. PATENT DOCUMENTS

| | | | |
|---|---|---|---|
| 285,953 | 10/1883 | Barr | 251/82 |
| 362,326 | 5/1887 | Smith | 251/82 X |
| 490,227 | 1/1893 | Ferrell | 251/252 |
| 1,503,132 | 7/1924 | Prator | 251/252 X |
| 1,879,320 | 9/1932 | Klett | 251/252 |
| 2,658,716 | 11/1953 | Wintree | 137/454.5 X |
| 3,377,048 | 4/1968 | Gruber | 251/175 |
| 3,941,152 | 3/1976 | Botnick | 137/549 |

FOREIGN PATENT DOCUMENTS

1210334  3/1960  France ............................. 251/252

Primary Examiner—Harold W. Weakley
Attorney, Agent, or Firm—Porter & Bremer Co.

[57] ABSTRACT

A closure-assisted valve includes a cartridge insertable into, and removable from, the remainder of the valve structure. The cartridge includes a displaceable piston having an elastomeric sealing member at one end engageable with a flat-surfaced valve seat. At the other end, the piston includes a drive surface against which a rotatable drive member is engaged. In a preferred embodiment, certain relatively movable portions of the cartridge include a cam surface and a cam follower. The cam surface is contoured such that the piston is advanced toward a valve closed position upon rotation of the drive member, but the last portion of piston travel prior to valve closure is only under the influence of gravity and fluid forces. In order to bias the piston toward a valve closed piston, entering fluid is directed around the piston so as to aspirate the piston toward a closed position. Upwardly extending channels divert a portion of the incoming fluid upwardly around the piston and thereafter downwardly against a face of the piston spaced from the valve seat. The pressure of the fluid against the face assists in constantly urging the piston toward a valve closed position. Other embodiments of the cartridge are disclosed, as well as a technique for manufacturing a spout included as part of a faucet assembly and a technique for attaching the faucet assembly to a mounting surface.

9 Claims, 25 Drawing Figures

CLOSURE-ASSISTED CARTRIDGE-TYPE FLOW CONTROL VALVE

This application is a continuation-in-part of Ser No. 286,949, filed July 27, 1981 which is a continuation of Ser. No. 52,976, filed June 28, 1979, both now abandoned.

CROSS-REFERENCE TO RELATED PATENT

SHUTOFF VALVE WITH CLEANOUT FILTER, U.S. Pat. No. 3,891,001, issued June 24,1975 to Irlin H. Botnick, here the "First Closure-Assisted Valve Patent," the disclosure of which is incorporated herein by reference.

DRAINABLE SHUTOFF VALVE WITH FILTER, U.S. Pat. No. 3,941,152, issued Mar. 2, 1976 to Irlin H. Botnick, here the "Second Closure-Assisted Valve Patent," the disclosure of which is incorporated herein by reference.

NON-FREEZE WALL HYDRANT WITH VACUUM BREAKER, U.S. Pat. No. 3,952,770, issued April 27, 1976 to Irlin H. Botnick, here the "Third Closure-Assisted Valve Patent," the disclosure of which is incorporated herein by reference.

BACKGROUND OF THE INVENTION

1. Field of the Invention

The present invention relates generally to a flow control valve and, more particularly, to a valve especially suited for use as a water faucet wherein the valved fluid assists in effecting a fluid-tight seal and wherein significant components of the valve form an easily replaceable cartridge.

2. Description of the Prior Art

Various forms of flow control valves or faucets have been developed for residential and other use to deliver fluids such as water. The need to frequently replace wear items in flow control valves has been a persistant problem. Individuals unfamiliar with plumbing work often encounter difficulties in effecting proper repairs and/or replacements of the defective components.

In a typical prior valve, a brase valve seat is included as part of the inlet section of the valve. An elastomeric washer is affixed to an elongate, threaded stem having an upwardly projecting handle portion. A packing surrounds the stem to prevent leakage. Upon rotation of the handle, the stem is advanced axially within the valve and the washer is advanced into or out of engagement with the valve seat. If the handle is tightened too much, the washer will be compressed to the point where its yield stress will be exceeded and the washer will adopt an undesired "set." This is a permanent deformation of the washer which eventually will lead to a leak. It is difficult to consistently tighten the handle so that waterflow is prevented and yet the yield stress of the washer is not exceeded.

The foregoing problem is made more difficult because of the type of contact which is created between the valve seat and the washer. In a typical valve, the washer is rigidly secured to the end of the stem. Accordingly, the washer is rotated as it is advanced into contact with the valve seat. The resultant frictional engagement with the valve seat abrades the washer and eventually causes it to wear to the point where a leak will occur. This problem increases with the passage of time because brass valve seats gradually deteriorate due to chemical reaction with water. The valve seats eventually lose their initial smooth surface and this leads to increased abrasion of the washers.

Yet additional problems exist then replacement of a washer is necessary. The washers often are difficult to remove from the end of the stem. Screws holding the washers in place may corrode, may become difficult to remove, and may break during attempted removal. It also is important that a replacement washer of the proper size, shape, and material be provided. This presents a challenge to the user who procures washers individually in order to repair various valves. Moreover, the "ever leaking" packings used to seal stems against leakage may be damaged during valve disassembly and reassembly with the result that leakage subsequently may occur around the stem.

In response to the foregoing concerns, several approaches have been suggested. One approach has been to avoid sliding contact between the washer and the valve seat in order to prevent frictional degradation of the washer. Either the stem is supported for non-rotating axial displacement toward and away from the valve seat, or the washer is rotatably secured to the stem so that, upon tightening of the stem, the stem rotates with respect to the washer, but the washer is fixed with respect to the valve seat. Although these approaches represent an improvement over more conventional valve constructions, they still fail to control the extent to which the washer is compressed. Consequently, it still is possible to "set" the washer and cause the valve to leak.

An approach which has had some success is to provide a power assist to the valve element during valve closure. The thought underlying this approach is that the user will be less likely to overtighten the washer if an assist is provided uring the closure process. For example, the valve may be a normally closed valve in which the valve element is biased toward a closed position by a spring or even by the pressure of the valved fluid itself. In one valve, a lost motion connection between the stem and the valve element attempts to eliminate excessive closure force as a problem. Although the basic idea of a closure assist is sound, it still has been difficult to replace components of closure-assisted valves although, of course, replacement of such components is needed less often than in non-closure-assisted valves.

In order to ease replacement difficulties, components of valves subject to wear have been provided in cartridge form. A cartridge is thought to be easier to remove and replace than individual components of a conventional valve. Because the components subject to wear are included as part of the cartridge, insertion of a new cartridge generally does not involve any significant concern about establishing sealing contact between movable components of the valve structure. The sealing concerns that do exist are relatively easily dealt with by the use of O-rings or other commonly used self-sealing members.

Although valves having power-assisted closures between nonrotating washers and valve seats included as parts of cartridges already are known, certain considerations still have not been addressed. One of these considerations relates to the nature of the closure assist. In one known valve, a spring has been used to carry and bias a vitreous valve element toward engagement with a valve seat. The spring is flexible and misalignment between the valve element and the valve seat is made possible. Also, the flexible nature of the spring can lead to "chatter" as the valve element is advanced toward a valve closed position. Further, as the spring begins to sag or take a set, the valve element will fail to effect a closure.

Another problem not addressed by prior carytridge valve proposals is that of providing a good seal between a movable stem and the cartridge without the use of a packing. Even though the threads of the stem may be tightly mated with threads in the cartridge, packing material of some kind still is needed.

Yet another problem not adequately addressed by prior cartridge valve proposals is that of permitting cartridge components to be manufactured inexpensively. Preferably the components will be long-lived plastic members capable of manufacture in an inexpensive molding process. It is desired that the cartridge employ a minimal number of complexly configured portions in order to decrease manufacturing expense and avoid the need to closely control production tolerances.

SUMMARY OF THE INVENTION

The present invention overcomes the foregoing and other drawbacks of prior art proposals by providng a novel and improved closure-assisted cartridge-type valve formed of inexpensive, long-lived plastic components. In accordance with the preferred practice of the present invention, a valve includes a cartridge insertable into, and removable from, the remainder of the valve structure. The cartridge is comprised entirely of moldable plastic and elastomeric materials.

In a preferred embodiment, the cartridge includes an assembly having an axially displaceable piston having an elastomeric sealing member at one end engageable with a flat-surfaced valve seat. At the other end, the piston includes a drive surface against which a rotatable drive member is engaged. The piston includes one or more laterally projecting cam followers which engage one or more cam surfaces included as part of the body portion of the cartridge. The cam surface of surfaces are contoured such that the piston is advanced toward a valve closed position upon rotation of the drive member, but the last portion of piston travel prior to valve closure is only under the influence of gravity and fluid pressure. Regardless of how tight the drive member is tightened, additional closure force cannot be imparted to the piston. Because both the sealing member and the valve seat are included as part of the cartridge, a desired relationship between the valving elemetns can be maintained at all times.

In order to provide a closure assist to the piston, entering waterflow is directed around the piston so as to aspirate the piston toward a closed position. The piston and the drive member define a plurality of upwardly extending channels which permit incoming water to flow upwardly around the piston toward the drive member and thereafter downwardly against a face of the piston spaced from the valve seat. The downward pressure of the water against the face, plus the vacuum created by the waterflow through the outlet, assists in constantly urging the piston toward a valve closed position.

In another embodiment, the cartridge includes an axially displaceable piston having an elastomeric washer secured at one end. At the other end, the piston includes an opening through which a loosely fitting pin having an enlarged head extends. The other end of the pin is connected to an axially displaceable drive member which can be advanced toward and away from the piston. The piston is a cage-like structure having annular formations at opposite ends connected by a plurality of ribs. The ribs permit water to flow through the midsection of the piston and against the inwardly facing portions of the annular formations.

The cartridge is located with respect to the rest of the valve structure such that water pressure acts against the back face of the annular formation carrying the washer. The pressure of the water itself acts as a closure assist to always urge the washer to a valve closed position. When it is desired to open the valve, the drive member is retracted until the head of the pin engages the annular formation spaced from the washer. At that point, the piston is lifted and water can flow outwardly of the valve. Even though the control member may be rotated, and thus the head of the pin may rotate with respect to the piston, the relative forces involved do not result in rotation of the piston and washer. Accordingly, the washer is not abraded against its mating valve seat.

Four types of pistons are disclosed. In all of these embodiments, the piston includes a surface or surfaces acted upon by the pressure of the fluid to be valved as such that the piston constantly is urged toward seating engagement with a mating valve seat. In all of these embodiments, the piston interacts with a drive member arranged with respect to the piston such that force is applied to the piston only to unseat the valve element and keep it open. By this expedient, the valve element cannot be damaged due to the user exerting excessive valve seating force.

Portions of the cartridge assembly other than the valve element are sealed against leakage by O-rings or compressible washers. This is in contrast to prior art threaded stems which typically require the use of packing material to prevent leakage. The O-rings and washers are inexpensive and self-sealing. The entire cartridge assembly is sufficiently inexpensive that it can be disposed of and replaced with a new cartridge rather than to be serviced. This disposable feature of the catridge assembly is a significant feature in consumer acceptance of the cartridge assembly.

A novel and improved spout construction also is included as part of the invention. Typical prior spouts have been formed from expensive, heavy brass castings or extrusions plated with a thin layer of metal such as chronium. Another known spout was manufactured entirely from plastics material which was incapable of reliable operation under working conditions normally imposed upon a spout. The spout according to the invention includes a thin-walled, relatively inexpensive conventional brass or copper tube having a circular cross section and a contour approxmating that of the completed spout. Machined forms brased to opposed ends of the tube provide adequate support for a screw-on aerator and a swivel mounting to be disposed within the body of a water distribution structure. Remaining portions of the spout are encased in an attractive plastic member or members. If desired, the tube can be placed in a mold and a unitary plastic shell can be formed about the tube. Alternatively, precast shells can be assembled in place about the tube. The shells can be secured to each other by ultrasonic welding, by hidden fasteners, or by various other conventional fastening techniques. The resultant spout is inexpensive, lightweight and attractive, and yet is fully capable of withstanding rigorous service requirements.

The invention further includes an improved technique for attaching a faucet assembly to a mounting surface such as a sink or countertop. Conventional faucet-attaching techniques employ externally threaded inlet piping extending through openings in the mounting surface. Nuts are threaded onto the piping and are tightened against the underside of the mounting surface to clamp the faucet assembly in place. Although this technique securely attaches the faucet assembly toi the mounting surface, it often is very difficult to properly tighten the nuts because of a lack of access to the underside of the mounting surface. Special tools sometimes are needed to properly tighten the nuts.

The present invention provides an alternate mounting technique by which mounting nuts and special tools are not needed. Essentially, a base plate is secured to the faucet assembly or is included as part of the faucet casting. Openings are formed in the base plate and toggle bolts are inserted through the openings. The toggle bolts then are inserted through previously formed openings in the mounting surface and, upon tightening of the toggle bolts, the faucet assembly will be attached securely to the mounting surface. Attachment of the faucet assembly to the mounting surface is made particularly easy because the toggle bolts are accessible from above the faucet assembly and require only a conventional screwdriver to be tightened.

These and other features and advantages, and a fuller understanding of the invention, may be had by referring to the following description and claims, taken in conjunction with the accompanying drawings.

BRIEF DESCRIPTION OF THE DRAWINGS

FIG. 16 is an exploded perspective view of another alternate, less preferred embodiment of the invention;

FIG. 17 is sectional view of the valve of FIG. 16 showing the valve elements in a valve closed position; and, FIG. 18 is a view similar to FIG. 17 showing the valve elements in a valve open position.

DESCRIPTION OF THE PREFERRED EMBODIMENT

Figures 1, 2, 3, 4, 5, 6:
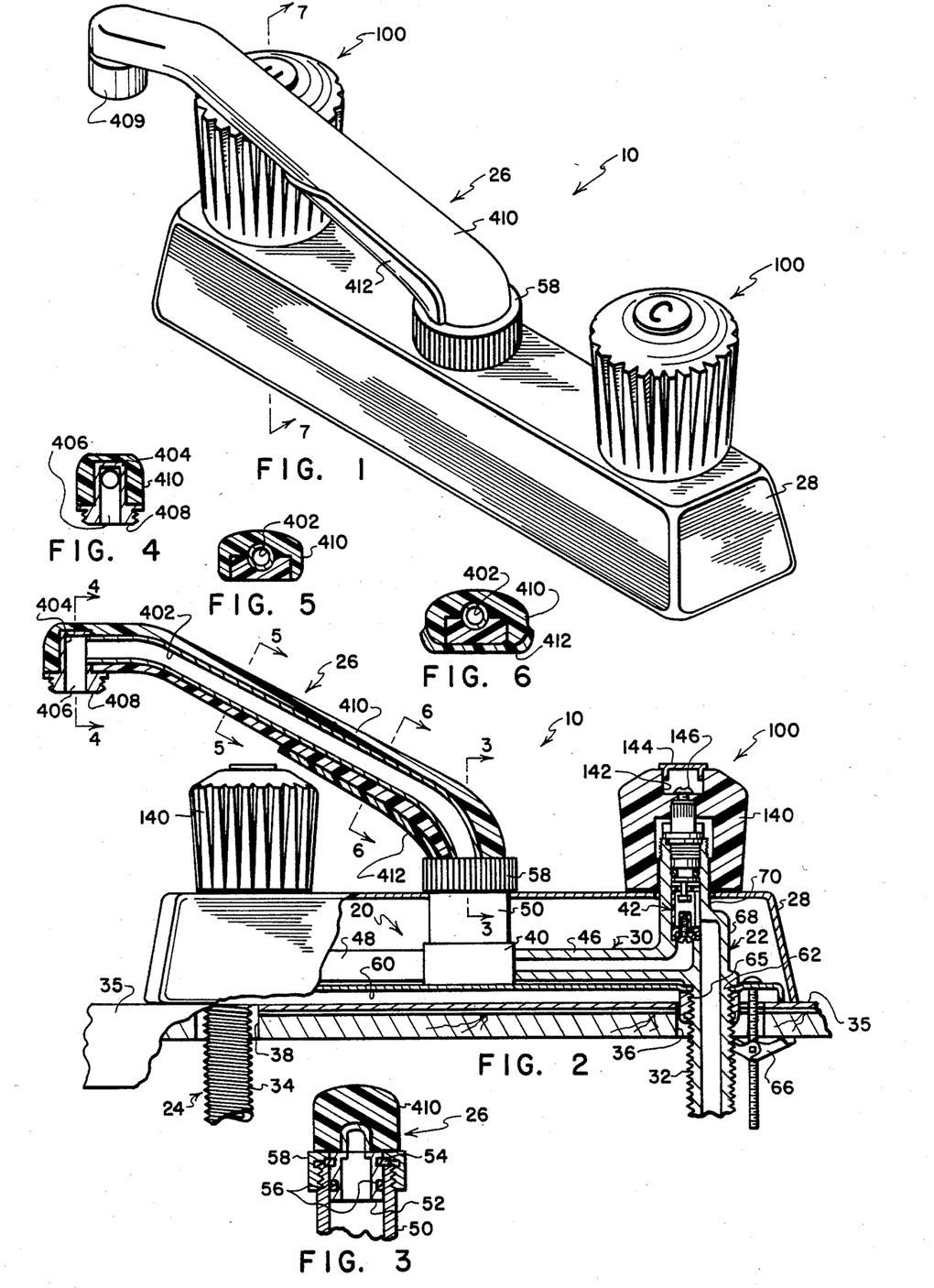
FIG. 1 is a perspective view of a faucet assembly including a cartridge and other features according to the present invention.
FIG. 2 is a side elevational view, partly in section, of the faucet assembly of FIG. 1 in which portions are broken away to permit underlying parts and internal constructions to be viewed.
FIGS. 3-6 are sectional views as seen from planes indicated by lines 3—3, 4—4, 5—5, and 6—6 respectively, in FIG. 2.

Referring to FIGS. 1 and 2, a faucet assembly is indicated generally by the numeral 10. The faucet assembly 10 is of a type intended for use in residential or commercial environments to selectively supply an unmixed flow of cold water, an unmixed flow of hot water, or various mixed flows of cold and hot water. The faucet assembly 10 principally includes a water distribution structure 20 and a pair of substantially identical valve assemblies 100. The structure 20 defines a cold water inlet 22, a hot water inlet 20, and a spout-type water outlet 26. A protective and decorative cover 28 encloses lower portions of the valve assemblies 100 together with upper portions of the structure 20.

Figure 7:
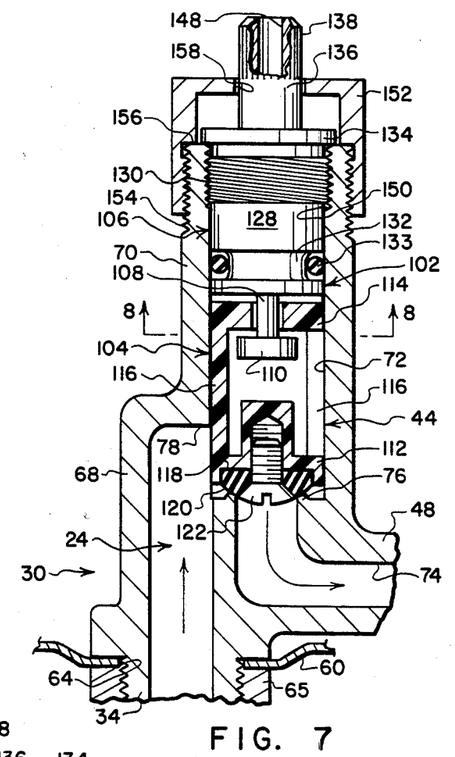
FIG. 7 is an enlarged sectional view of a portion of the valve assembly of FIG. 1, as seen from a plane

Referring to FIGS. 2 and 7, the distribution structure 20 includes a one-piece brass casting 30. The inlets 22, 24 are formed as integral depending parts 32, 34 of the casting 30. The depending parts 32, 34 are of tubular configuration and have threaded outer surfaces. Cold and hot water supply line connections (not shown) may be threaded or brazed onto the parts 32, 34 to communicate the inlets 22, 24 with pressurized sources of cold and hot water. The parts 32, 34 may serve as a means for attaching the faucet assembly 10 to a mounting surface 35 such as a sink or countertop. Referring to FIG. 2, the parts 32, 34 may be extended through openings 36, 38 in the mounting surface and may be secured in place by threaded nuts (not shown).

The casting 30 includes a spout adaptor 40 disposed midway between the inlets 22, 24. A cold water valve assembly 42 is in fluid communication with the cold water inlet 22, and a hot water valve assembly 44 is in fluid communication with the hot water inlet 24. Conduits 46, 48 connect the cold water valve assembly 42 and the hot water valve assembly 44, respectively, to the spout adaptor 40.

Referring to FIGS. 2 and 3, the spout adaptor 40 includes an upwardly extending region 50 into which a swivel portion 52 of the spout 26 extends. As seen in FIG. 3, a metal snap ring 54 and a resilient O-ring 56 are positioned in grooves extending around the circumference of the swivel portion 52. A nut 58 is threaded onto the upwardly extending region 50 and serves to clamp the snap ring 54 into snug engagement with the uppermost surface of the upwardly extending region 50. The O-ring 56 prevents leakage between the swivel portion 52 and the upstanding region 50. By this arrangement, a pivotal connection is established between the spout 26 and the spout adaptor 40.

The cover 28 is formed from a corrosion resistant material. Threaded fasteners (not shown) may be used to secure the cover 28 to the casting. 30. Alternately, the cover 28 may be configured such that, when the nut 58 is tightened in place, it serves to clampingly retain the cover 28 in position.

Referring to FIGS. 2 and 7, in order to strengthen the distribution structure 20 and in order to provide an alternate mounting technique, a base plate 60 is secured to the underside of the casting 30. The base plate 60 includes openings 62, 64 which snugly fit about the depending parts 32, 34, respectively. Nuts 65 are threaded onto the parts 32, 34 to clamp the base plate 60 against the underside of the valve assemblies 42, 44. Toggle bolts 66 extend through holes formed in the base plate 60 and are positioned laterally outwardly of the valve structures 42, 44. By extending each toggle bolt 66 through the openings 36, 38 in the mounting surface 35, the base plate 60 and hence the faucet assembly 10 can be secured to the mounting surface without the difficult task of attaching nuts to the depending parts 32, 34 and tightening the nuts against the underside of the mounting surface.

Each of the valve asssemblies 42, 44 includes a housing 68 into which its respective inlet 22, 24 extends. The valve structures 42, 44 each include an upwardly extending receptacle 70. A cylindrical passagway 72 is formed in the receptacle 70 and opens through the end surface of the receptacle 70. The conduits 46, 48 extend laterally from the housings 68 toward the spout adaptor 40. Each of the conduits 46, 48 includes a passageway 74 in fluid communication with the passageway 72. Referring to FIG. 7, the passageway 74 is smaller in diameter than the passageway 72. An annular rim 76 provides a transition between the passageways 72, 74 and serves as a valve seat as will be described. The inlets 22, 24 terminate in an upper wall 78 and open into the passageway 72. By this construction, fluid flowing in the inlets 22, 24 is directed by the way 78 into the passageway 72 before being discharged through the passageway 74.

A valving cartridge 102 is disposed within the passageway 72 and engages the valve seat 76 to effect a sealing function. The valving cartridge 102 includes a valve element in the form of a piston 104 as well as a drive member 106 from which a pin 108 having a head 110 extends. The piston 104 includes a lower annular formation 112, an upper annular formation 114, and a plurality of rib formtions 116 connecting the spaced annular formations 112, 114. The outer diameter of the formations 112, 114, 116 approximates the inner diameter of the passageway 72 so that axial movement of the piston 104 within the passageway 72 is possible, but vibration or "chatter" of the piston is eliminated.

The lower annular formation 112 includes a recessed portion 118 within which a washer 120 is secured by a fastener 122. The washer 120 is made of a flexible, elastomeric substance and may be provided in a variety of shapes. In the embodiment under consideration, the washer 120 is rigidly secured to the annular formation 112 so that relative motion between the two is not possible.

Figure 8:
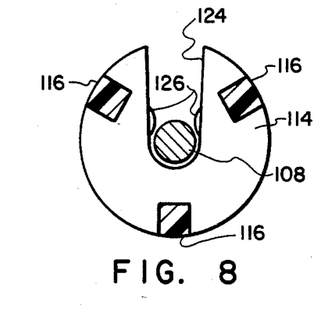
FIG. 8 is a sectional view as seen from a plane indicated by line 8—8 in FIG. 7.

Referring to FIGS. 7 and 8, the upper annular formation 114 includes a radially inwardly extending slot 124. The slot 124 at its outer end opens through the radially outer surface of the formation 114. The slot 124 near its inner end includes a pair of opposed, spaced, inwardly extending projections 126. Referring particularly to FIG. 8, it will be seen that the pin 108 can be snapped into the slot 124 and retained in place by the projections 126.

The drive member 106 includes a central body portion 128, an externally threaded portion 130 near its upper end, and a circumferential groove 132 near the end of the drive member 106 closet to the piston 104. An O-ring 133 is fitted into the groove 132 to create a fluid-tight seal against the walls of the passageway 72. A disc-like upper end portion 134 extends outwardly of the drive member 106 near the threaded portion 130. The disc-like portion 134 engages the end surface of the receptacle 70 to limit displacement of the drive member 106 into the passageway 72. A stem 136 extends coaxially upwardly from the center of the disc-like portion 134. The stem 136 is splined at 138 to provide a driving interconnection between the stem 136 and a splined portion of a control lever or knob 140.

Referring to FIG. 2, the knob 140 includes a central, recessed portion 142 covered in normal use by an overcap 144. The overcap 144 is labeled with an "H" or a "C" to indicate whether hot or cold water is controlled by the control knob 140. The threaded fastener 146 is inserted into the recessed portion 142 and into a longitudinal opening ing 148 formed in the end of the stem 136. Upon tightening the fastener 146, the control knob 140 will be rigidly secured to the stem 136 in driving relationship.

The threaded portion 130 of the drive member 106 engages a threaded inner surface 150 of the passageway 72. Upon appropriate rotation of the control knob 140, the drive member 106 will be advanced axially within the passageway 72. Inward movement of the drive member 106 is limited by the disc-like portion 134. A nut 152 overlies the disc-like portion 134 and includes a threaded inner surface which engages a threaded end portion 154 of the receptacle 70. The nut 152 includes a radially inwardly extending annular ledge 156 which engages the end surface of the receptacle 70 to control the relative axial relationship between the nut 152 and the receptacle 70. The nut 152 includes a central opening 158 through which the stem 136 extends. Upon appropriate rotation of the control knob 140, the drive member 106 will be advanced axially out of the passageway 72 until the underside of the nut 152 is encountered.

Figure 9:
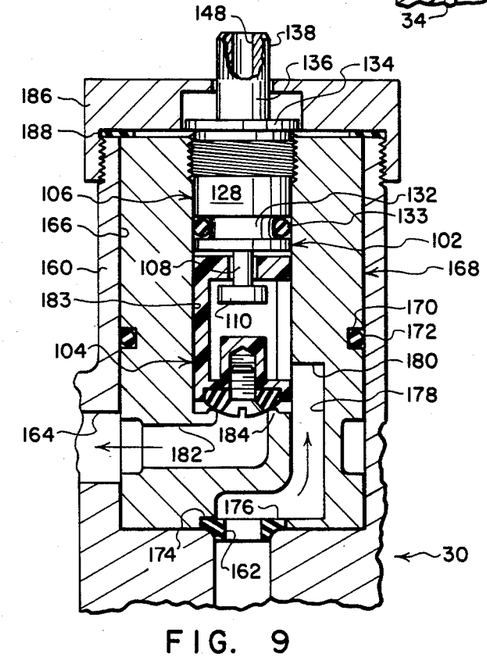
FIG. 9 is a sectional view similar to FIG. 7 showing an alternate embodiment of a valve assembly.

An alternative embodiment of the invention is illustrated in FIG. 9. The valving cartridge 102 is identical with that in the embodiment of FIG. 7. The casting 30 includes an upwardly extending cup-like receptacle 160 having an inlet opening 162 formed in its lower surface and an outlet opening 164 formed in its side wall. The receptacle 160 includes a cylindrical inner surface 166 within which a cartridge 168 is disposed. The cartridge 168 includes a circumferential groove 170 within which a resilient O-ring 172 is disposed. The O-ring 172 is in sealing engagement with the walls of the passageway 166 to effect a sealing function. The cartridge 168 also includes a recessed portion 174 in its lowermost surface within which a resilient washer 176 is placed. The washer 176 engages the opening 162 in the casting 30 to effect a sealing function.

Internal flow passages within the cartridge 168 are similar to the passages included as part of the casting 30 in the embodiment of FIG. 7. A vertically extending conduit 178 terminates in an upper wall 180. An outlet conduit 182 is in fluid communication with the opening 164. A passageway 183 receives the valving cartridge 102. An annular rim 184 provides a transition between the passageways 182, 183 and also serves as a valve seat. Fluid flowing through the conduit 178 is directed by the wall 180 into the passageway 183 before being discharged through the conduit 182.

A threaded nut 186 is secured to the upper portion of the receptacle 160. The nut 186 is similar to the nut 152 and performs an identical function. Additionally, a resilient, flat annular washer 188 is clamped in place between the upper surface of the receptacle 160 and the nut 186. The washer 188 assists in effecting a fluid-tight seal.

In operation, the embodiments of FIGS. 7 and 9 operate identically. In order to permit fluid to flow, the control knob 140 is rotated appropriately so that the drive member 106 and, hence, the head 110 is moved axially toward the upper end of the passageway 72. The head 110 eventually engages the underside of the annular formation 114. Continued movement of the drive member 106 results in the piston 104 being lifted. In turn, the washer 120 is displaced from the valve seats 76, 184.

When it is desired to close the valve, the control knob 140 is rotated in a direction to advance the drive member 106 toward the valve seats 76, 184. Under the influence of gravity, the aspirating effect created by fluid flowing around the lower formation 112, and due to the force of the fluid impacting the upper surface of the lower formation 112, the piston 104 always is urged toward a valve closed position. As rotation of the control knob 140 is continued, the washer 120 eventually seats against the valve seats 76, 184.

Even if the rotation of the control knob 140 is continued in an effort to tighten the washer 120 still further against the valve seats 76, 184, additional force cannot be imparted to the washer 120 because of a lost motion connection between the drive member 106 and the piston 104. As seen in FIGS. 7 and 9, continued advancement of the drive member 106 toward the valve seats 76, 184 results in clearance between the head 110 and the upper formation 114. The disc-like portion 134 contacts the end surface of the receptacle 70 or the end of the cartridge 168 before the body portion 128 contacts the upper formation 114.

Even though the pin 108 and the head 110 rotate as they are advancing axially within the passageway 72, the relative forces involved between the head 110 and the upper formation 114 are such that the piston 104 is not rotated. Consequently, no rotational movement between the washer 120 and the valve seats 76, 184 is possible. Because valve seating is only under the influence of gravity and fluid forces, and because the washer 120 does not rotate with respect to the valve seats 76, 184, the valve is extremely long-lived. Should replacement of the washer 120 become necessary, it is an extremely simple matter to remove the valving cartridge 102 and replace only the washer 120. Alternately, the valving cartridge 102 is sufficiently inexpensive that the entire valving cartridge 102 or the cartridge 68 can be replaced, if desired.

An especially preferred embodiment of the invention is illustrated in FIGS. 10–12G. A valve cartridge 200 includes a housing 202, a piston 204 axially movable within the housing 202, and a drive member 206 engageable with the piston 204. A portion of the casting 30 includes an upwardly extending receptacle 208 within which the cartridge 200 is disposed. A pair of diametrically opposed notches (not shown) are formed in the periphery of receptacle 208. A fluid inlet 210 conveys fluid to an annular chamber 212 formed in the lower portion of the receptacle 208. An outlet passageway 214 (only the upper portion of which is shown) conveys valved fluid to the spout 26. A counterbored portion 216 provides a transition between the annular chamber 212 and the outlet 214 and also provides a place against which a seal can be formed between the portion 216 and the housing 202. The seal is provided by an O-ring 217 located at the end of the housing 202 and which engages the inner surface of the portion 216 in a fluid-tight relationship.

Figures 10, 11, 12, 12A:
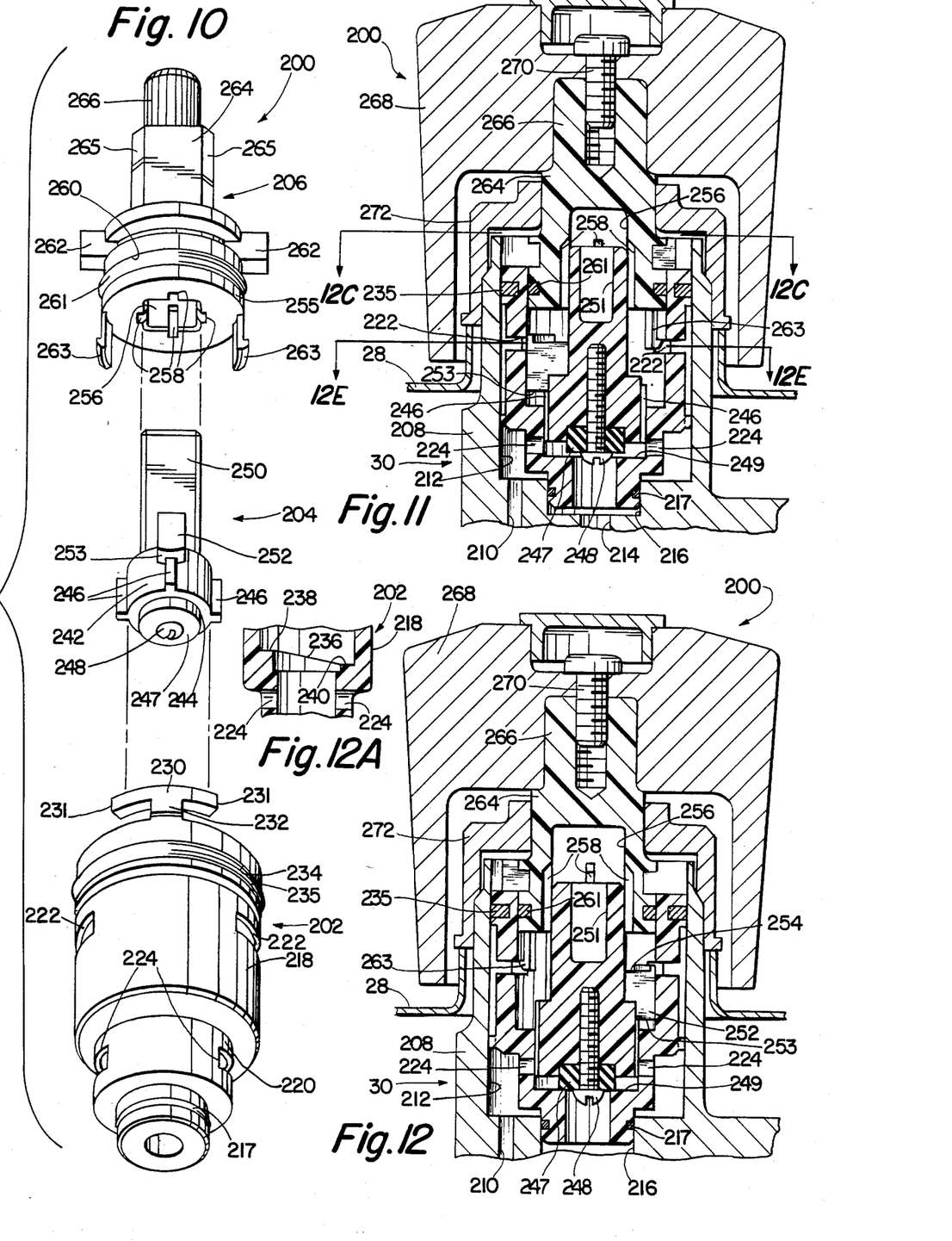
FIG. 10 is an exploded perspective view showing elements of a preferred embodiment of the invention.
FIG. 11 is a sectional view of the valve of FIG. 10 showing the valve elements in a valve open position.
FIG. 12 is a view similar to FIG. 11 showing the valve elements in a valve closed position.
FIG. 12A is an enlarged, cross-sectional view of a portion of the valve of FIG. 10.

Referring particularly to FIG. 10, the housing 202 includes a cylindrical body portion 218 from which a skirt 220 of reduced diameter extends. The body portion 218 and the skirt 220 define a bore extending through the housing 202 from one end to the other. The body portion 218 includes a pair of slots 222 extending circumferentially of the body portion 218. Each slot 222 extends circumferentially of the body portion 218 about 90 degrees and is spaced an equal distance from the upper end surface of the body portion 218. A pair of openings 224 are formed in the skirt 220 to permit fluid to flow from the inlet 210 into the bore defined by the body portion 218 and the skirt 220.

Figure 12B:
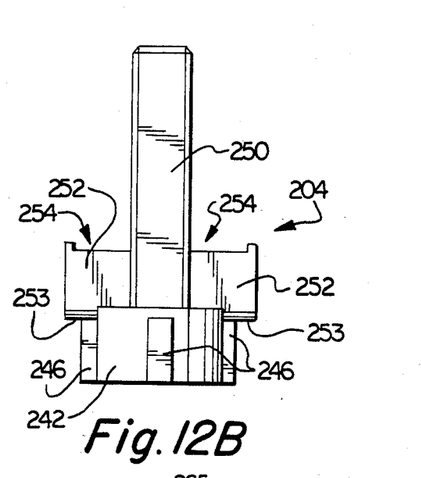
FIG. 12B is a side elevational view of a piston used with the valve of FIG. 10.
Figure 12C:
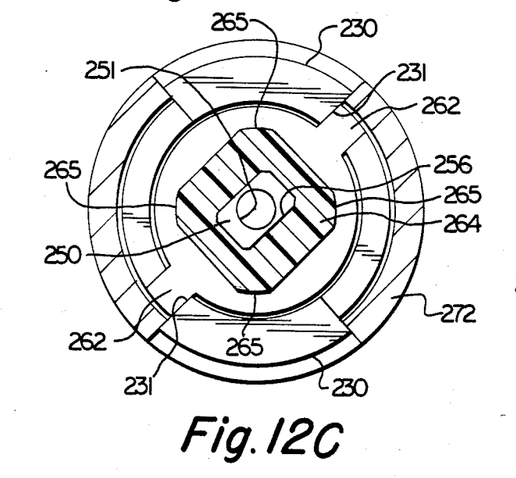
FIGS. 12C and 12D are cross-sectional views of the valve of FIG. 10 taken along a plane indicated by line 12C–12C in FIG. 11.
Figure 12D:
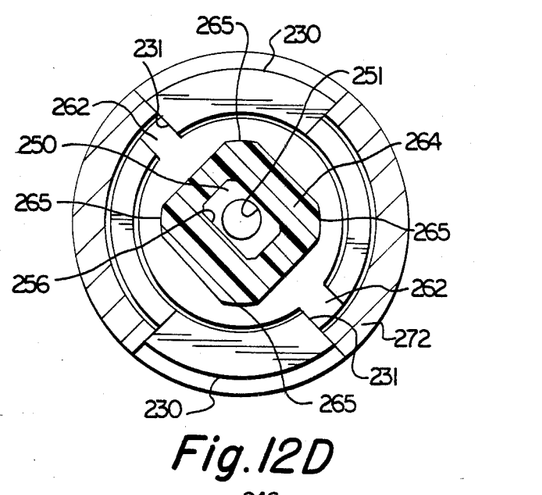
Figure 12E:
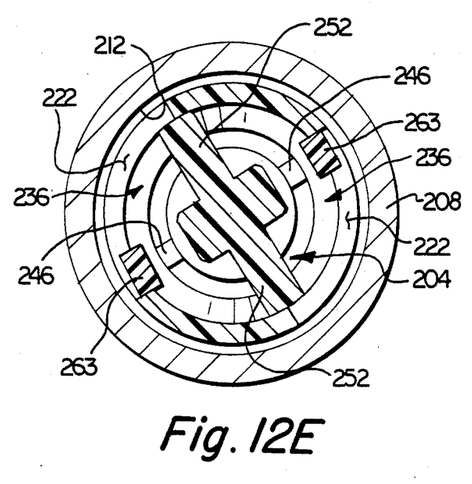
FIGS. 12E and 12F are cross-sectional views of the valve of FIG. 10 taken along a plane indicated by line 12E—12E in FIG. 11.
Figure 12F:
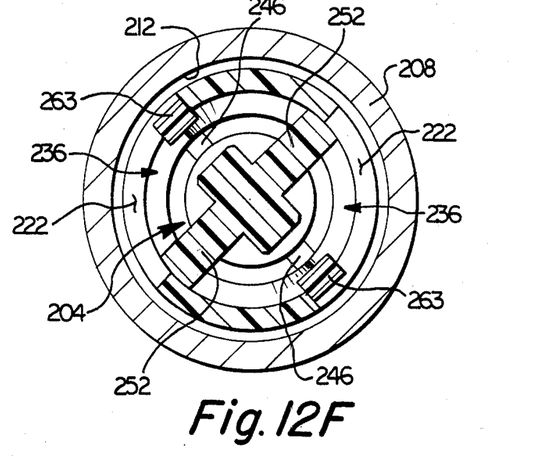
Figure 12G:
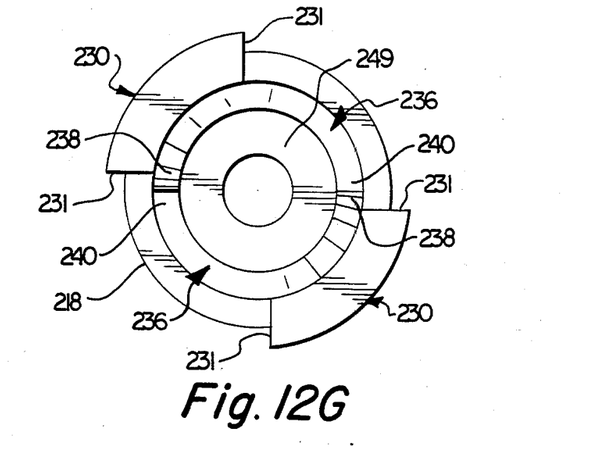
FIG. 12G is a top plan view of a housing used with the valve of FIG. 10.

A pair of diametrically opposed lugs 230 extend upwardly from the body portion 218. The lugs 230 are positioned at the periphery of the body portion 218 and include stop surfaces 231 and axially aligned projections 232. A circumferential groove 234 is formed in the outer surface of the body portion 218 and an O-ring 235 is disposed in the groove 234. Referring especially to FIGS. 12A and 12G, the body portion 218, on its inner surface, includes opposed, circumferentially extending cam surfaces 236. Each cam surface 236 defines a smoothly contoured ramp having a peak 238 and a low point 240.

The piston 204 nests within the housing 202 and is supported for axial as well as rotational movement therein. The piston 204 includes a cylindrical portion 242 having a downwardly facing opening 244. A plurality of axially extending ribs 246 project outwardly from the sides of the cylindrical portion 242. The ribs 246 bear against the inner surface of the upper portion of the skirt 220 and serve to cage the piston 204 for axial movement within the housing 202 while permitting fluid to flow about the outer surface of the piston 204. The end of the piston 204 carries a sealing member in the form of a washer 247 held in place within the opening 244 by means of a fastener 248. The washer 247 engages a flat inner surface 249 of the housing 202 so as to provide a valving capability.

The piston 204 also includes an upper drive portion 250 extending from the upper surface of the cylindrical portion 242. The drive portion 250 is rectangular in cross section in order to provide a driving engagement with the drive member 206. The drive portion 250 includes an upwardly facing opening 251. A pair of diametrically opposed cam followers 252 having rounded bottom surfaces 253 project laterally outwardly of the piston 204. The surfaces 253 ride upon the cam surfaces 236. Upon rotation of the piston 204, the cam followers 252 will be rotated and thus the piston 204 will be moved axially within the housing 202. The upper surfaces of each of the cam followers 252 includes a channel 254.

The drive member 206 includes a cylindrical base portion 255 having a downwardly facing opening 256 formed therein. The opening 256 conforms to the cross section of the drive portion 250 and includes four axially extending slots 258 formed in its side walls. Due to the rectangular cross-section of both the drive portion 250 and the opening 256, a proper functional relationship between the piston 204 and the housing 202 is insured. A circumferential groove 260 carrying an O-ring 261 is formed in the outer surface of the body portion 255 and a pair of diametrically opposed ears 262 project from the body portion 255. A pair of diametrically opposed tabs 263 also project from the body portion 255 in vertical alignment with the ears 262. A generally rectangular portion 264 having rounded side edges 265 projects outwardly of the upper surface of the body portion 255. A drive stem 266 projects from the upper surface of the portion 264. The drive stem 266 is splined in order to provide a driving relationship with a control knob 268. In a manner similar to that of the control knob 140, a fastener 270 secures the control knob 268 to the end of the drive stem 266.

Assembly of the preferred embodiment takes place as follows: First, the sealing member 247 is secured within the opening 244 of the piston 204 by means of the fastener 248 and the O-rings 217, 235 are attached to the housing 202. The drive portion 250 of the piston 204 is placed into the opening 256 included as part of the drive member 206 which properly orients the cam followers 252, the ears 262, and the tabs 263. With the piston 204 inserted into the drive member 206, the piston 204 and the drive member 206 then are pressed into the housing 202 and are rotated as necessary so that the ears 262 clear the lugs 230 and rest atop the body portion 218. At this point, the tabs 263 will have been forced into the slots 222 so that disassembly of the cartridge 200 will not be possible.

After the cartridge 200 has been assembled, it is inserted into the receptacle 208 so that the projections 232 of the lugs 230 are fitted into the notches included as part of the casting 30. The O-ring 217 will make contact with the inner surface of the counterbored portion 216 to effect a fluid-tight seal. The O-ring 235 will engage the inner walls of the receptacle 208 and effect a fluid-tight seal. In order to retain the cartridge 200 in place within the receptacle 208, a nut 272 is threadedly secured to the upper end of the receptacle 208. The nut 272 contains the upper surface of the lugs 230 and the body portion 255. The bottom portion of the nut 272 engages the cover 28 to help retain the cover 28 in place.

It will be assumed that the control knob 268 has been rotated to a position such that the ears 262 engage the stop surfaces 231 of the lugs 230. At this point, the cam followers 252 are near the peak 238 of the cam surfaces 236. Rotation of the drive member 204 always is limited by engagement of the ears 262 against the stop surfaces 231, and not by engagement of the tabs 263 against the ends of the slots 222. In this position, the piston 204 will be lifted to that position shown in FIGS. 11, 12C, and 12E and fluid flow through the valve will be made possible. Under these conditions, a small flow of fluid passes upwardly about the outer surface of the piston 204, through the channels 254, through the gap formed by the slots 258 and the outer surface of the drive stem 250, and downwardly into the opening 251. The pressure exerted by this flow of fluid, combined with the aspirating effect of the fluid flowing more or less directly from the inlet 210 to the outlet 214 tends to always urge the piston 204 to a valve closed position. Gravity also acts on the piston 204 to urge the piston 204 to a valve closed position.

In order to close the valve, the control knob 268 is rotated clockwise so that the drive member 206 and, hence, the piston 204 is rotated. The cam followers 252 will move downwardly along the cam surfaces 236 thus permitting the piston 204 to be urged toward the surface 249. As the piston 204 approaches the low point 240 of the cam surfaces 236, the cam followers 252 finally disengage the cam surfaces 236 and the washer 247 at that point is engaged with the flat inner surface 249. When the washer 247 engages the surface 249, fluid flow through the valve ceases. Regardless of whether fluid pressure in the inlet 210 changes, forces acting on the piston 204 always will be such that the washer 247 will be urged into engagement with the surface 249; the higher the fluid pressure, the greater the sealing force exerted on the piston 204.

Because relative rotational motion between the piston 204 and the surface 249 is minimized as the piston 204 approaches the valve closed position, the washer 247 is not abraded. In the initial and final stages of opening and closing the valve, the piston 204 is rotated as it is moved axially, but this limited amount of relative motion between the washer 247 and the surface 249 has been found to be negligible and does not adversely affect the longevity of the washer 247. The life of the valve also is enhanced because the washer 247 and the surface 249 are made of substantially non-deteriorating plastic and elastomeric materials. In addition, because the washer 247 and the surface 249 are entirely contained within the cartridge 200, and because the piston 204 is only rotated by the drive member 206 (and not moved axially by the drive member 206), dimensional variations in various installations and forces imparted to the housing 202 by the nut 272 cannot influence the sealing characteristics of the washer 247 and the surface 249. In short, "tolerance stack up" has been eliminated as a concern in the relationship between the valving elements.

Figure 13:
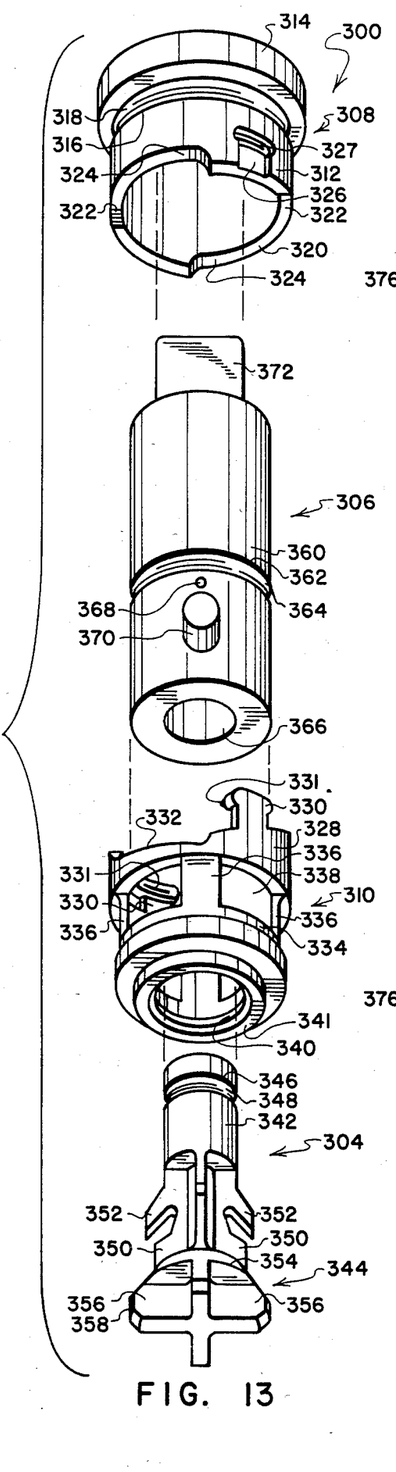
FIG. 13 is an exploded perspective view of an alternate, less preferred embodiment of the invention.
Figure 14:
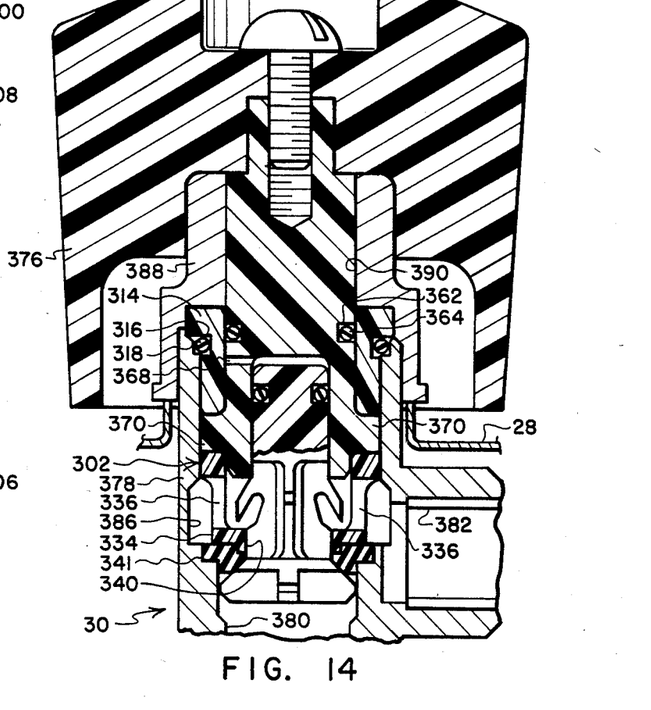
FIG. 14 is a sectional view of the valve of FIG. 13 showing the valve elements in a valve closed position.
Figure 15:
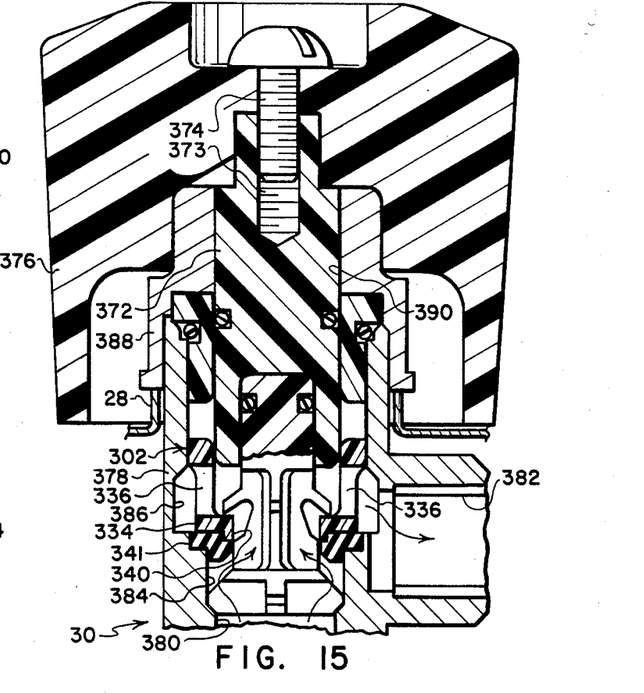
FIG. 15 is a sectional view similar to FIG. 14 showing the valve elements in a valve open position.

An alternate embodiment of the invention is shown in FIGS. 13–15. The embodiment of FIGS. 13–15 differs from that of FIGS. 10–12 in its provision of a modified cartridge 300 having a two-part housing 302, a piston 304, and a drive member 306. The housing 302 includes an upper portion 308 and a lower portion 310. The upper and lower portions 308, 310 are manufactured separately, but snap together during assembly and thereafter function as a unitary assembly.

The upper housing member 308 includes a body portion 312 and an enlarged annular flange 314 extending from the upper surface of the body portion 312. A circumferential groove 316 is formed at the interface between the body portion 312 and the flange 314. An O-ring 318 is disposed within the groove 316 to effect a sealing function as will be described. The lower end surface of the housing 312 is contoured to provide a pair of diametrically opposed cam surfaces 320. The cam surfaces 320 are inclined smoothly from a peak 322 to a low point 324. The cam surfaces 320 extend about the circumference of the body portion 312 for about 120 degrees. A recess 326 is formed in the outer, lower surface of the body portion 312 between the peak 322 of one cam surface 320 and the low point 324 of the other cam surface 320. A notch 327 is included as part of the recess 326.

The lower portion 310 of the housing 302 includes an upper portion 328 of the same diameter as the body portion 312. A pair of vertically extending tabs 330 having projections 331 extend from the end surface of the upper portion 328 and are adapted to engage the recesses 326 and the notches 327 so as to lock the upper and lower portions 308, 310 together. A pair of diametrically opposed cam surfaces 332 are formed on the end surface of the upper portion 328. The cam surfaces 332 are parallel to the cam surfaces 320. When the upper and lower portions 308, 310 are snapped together, the cam surfaces 320, 332 define a cam slot within which a cam follower can move.

The lower portion 310 includes a ring 334 spaced from its lower end surface and lying in a plane parallel to the lower end surface. The ring 334 is spaced from the upper portion 328 by a plurality of vertically extending ribs 336. The ribs define a plurality of openings 338 through which fluid can flow. The lower surface of the ring 334 includes a projecting rim 340. A sealing member 341 is fitted about the rim 340. The sealing member 341 provides a seal between the cartridge 300 and the casting 30 as well as a seal between itself and the piston 304.

The piston 304 includes a stem 342 and a head 344 extending from the lower end of the stem 342. The upper portion of the stem 342 is cylindrical and includes a circumferential groove 346 within which an O-ring 348 is disposed. The lower portion of the stem includes a plurality of radially extending ribs 350. A portion of two diametrically opposed ribs 350 is removed and the upper portion is of enlarged diameter to form reversely bent hooks 352. The head 344 includes a beveled annular sealing surface 354 and a plurality of radially extending ribs 356. The radially outermost portion of the ribs 356 defines an outer diameter 358.

The drive member 306 includes a cylindrical body portion 360 having a circumferential groove 362 formed approximately midway along its length. An O-ring 364 is disposed in the groove 362. A longitudinally extending opening 366 is formed in the lower end of the body portion 360 and is of a diameter to receive the stem 342 of the piston 304. A vent hole 368 extends through the wall of the body portion 360 and is in communication with the opening 366. A pair of diametrically opposed cylindrical cam followers 370 project outwardly of the body portion 360 near a lower portion of the body portion 360. The cam followers 370 are of a diameter to be fitted snugly within the slots defined by the cam surfaces 320, 332. A square drive 372 projects from the upper end surface of the body portion 360. The drive 372 includes a longitudinally extending opening 373 within which a fastener 374 can be secured. This construction permits a control knob 376 to be secured to the drive member 306 in driving relationship.

The cartridge 300 is fitted within a portion of the casting 30. The casting 30 includes a vertically extending receptacle 378 within which the cartridge 300 can be inserted. A fluid inlet 380 directs incoming fluid against the underside of the head 344 of the piston 304. An outlet 382 conveys valved fluid outwardly of the cartridge 300. The inlet 380 includes a chamber 384 within which the head 344 of the piston 304 reciprocates. The outer diameters 358 of the ribs 356 engage the walls of the chamber 384 to prevent the piston 304 from vibrating or chattering under the influence of variable fluid currents such as occur during a valving operation. The spaces between the ribs 356 permit fluid to flow around the beveled surface 354, into the cartridge 300, and out of the cartridge 300 through the outlet 382. The receptacle 378 includes an enlarged-diameter chamber 386 in vertical alignment with the ribs 336, the openings 338, and the outlet 382. A nut 388 is threadedly secured to the outer upper surface of the receptacle 378. The nut 388 is configured on its inner surface to clamp the flange 314 firmly against the upper end surface of the receptacle 378 and thus retain the cartridge 300 firmly in place within the receptacle 378. The nut 388 includes a central opening 390 adapted to snugly receive the body portion 360 of the drive member 306. The lower, outer portion of the nut 388 engages a portion of the cover 28 to clampingly retain the cover 28 in place.

Assembly of this embodiment of the invention is carried out as follows:

(1) The O-ring 348 is placed within the groove 346.

(2) The sealing member 341 is placed about the stem 342 and forced over the hooks 352 so that it loosely rests against the beveled surface 344 and sealing surface 354.

(3) The stem 342 is inserted through the opening defined by the ring 334 and the rim 340. The sealing member 341 is fitted about the rim 340. The hooks 352 prevent removal of the piston 304 from the lower housing portion 310.

(4) The drive member 306 is pressed over the stem 342. The O-ring 348 serves only to loosely frictionally retain the stem 342 within the opening 366 and does not effect a fluid-tight seal.

(5) The upper portion 308 of the housing 302 is placed over the body portion 360 of the drive member 306. The cam followers 370 are disposed such that they are placed between the opposed cam surfaces 320, 332. The housing members 308, 310 then are pressed together until the tabs 330 and the projections 331 engage the recesses 326 and the notches 327. At this point, the cartridge 300 is completely assembled.

(6) The assembled cartridge 300 then is inserted into the receptacle 378 and is retained in place there by the nut 388. The control knob 376 is secured to the end of the drive member 306 by the fastener 374 and assembly of the valve is complete. The compressive forces exerted by the nut 388 compress the O-ring 318 and the sealing member 341. The compression of these resilient members prevents fluid leakage. The O-ring 364 prevents fluid leakage between the inner surface of the housing 302 and the outer surface of the drive member 306.

In operation, it will be assumed that the valve is in the closed position illustrated in FIG. 14. Because incoming fluid acts against the head 344 of the piston 304, the piston 304 always is urged to the valve closed position illustrated in FIG. 14. In this position, the lugs 370 will have been rotated to the upper extent of the cam surfaces 320, 332.

In order to open the valve, the knob 376 is rotated such that the lugs 370 are advanced along the cam surfaces 320, 332 toward the low point 324. The pressure of the incoming fluid will force the end of the stem 342 to completely fill the opening 366. The vent hole 368 permits trapped air or fluid to be forced out of the opening 366. At that point, and in response to continued movement of the drive member 306, the piston 304 will be moved away from the sealing member 341 toward a valve open position.

The nature of the seating and unseating action is similar to that between the piston 204 and the sealing surface 249. That is, during valve closure, the piston 304 is seated entirely under the influence of fluid pressure because of a lost motion connection between the drive member 306 and the piston 304. Continued tightening of the control knob 376 does not result in additional closure forces being imparted to the piston 304, but only a separation between the stem 342 and the inner surface of the opening 366 occurs. Consequently, there is little or no relative motion between the beveled surface 354 and the sealing member 341 during valve closure. Upon opening of the valve, there is axial relative motion between the beveled surface 354 and the sealing member 341, but rotational relative motion is negligible and does not result in degradation of the sealing member 341.

Figures 16, 17, 18:
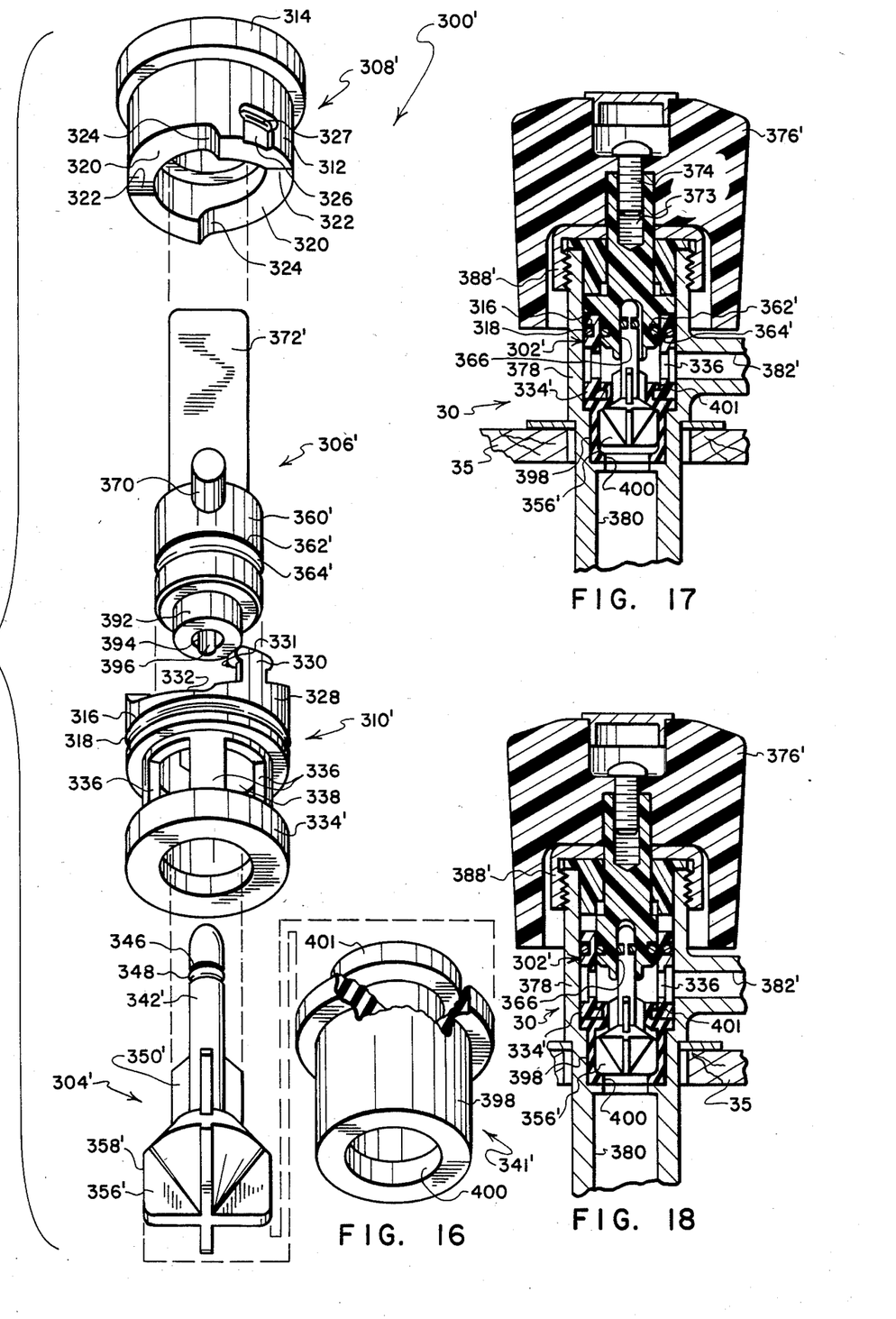

Another embodiment of the invention is shown in FIGS. 16–18. Since a majority of the components of this embodiment find similar, if not identical, counterparts in the previously described embodiment of FIGS. 13–15, the same reference numerals as used previously are used once again where appropriate. Where the reference numerals used in FIGS. 16–18 are exactly the same as numerals used in FIGS. 13–15, these numerals refer to parts or features of exactly identical construction to those described previously. Where reference numerals used in FIGS. 16–18 bear a "prime" mark, they refer to corresponding parts or features which are somewhat differently configured than those described previously. Where entirely new reference numerals are used in FIGS. 16–18, these newly adopted numerals refer to entirely new parts or features.

The embodiment of FIGS. 16–18 differs from that of FIGS. 13–15 in its provision of a modified housing 302', a modified piston 304', a modified drive member 306', and a modified sealing member 341'. The lower housing portion 310' differs in that its ring 334' is thicker and heavier than the ring 334. The groove 316' and the O-ring 318' have been moved from the upper housing portion 308' to the lower housing portion 310'. In other respects the housing is unchanged. The drive member 306' differs in the axial extent of the body portion 360', the location of the circumferential groove 362', and in the addition of an axially extending stepped portion 392 projecting from the lower surface of the body portion 360'. The stepped portion 392 includes a centrally disposed opening 394 having a groove 396. The opening 394 is aligned with the opening 366 so that a continuous passageway is formed from the lowermost surface of the drive member 306' to an interior portion of the drive member 306'. The groove 396 is carried the length of the opening 366.

The piston 304' differs in that the stem 342' is elongated and the ribs 350' do not include hooks 352. The ribs 356' are different in that the outer diameter 358' is vertically elongated compared to the outer diameter 358.

The sealing member 341' differs in that a depending annular skirt 398 having an inwardly turned flange 400 has been included, as well as upper, outwardly directed flanges 401, 401'. The flanges 401,401' engage the innermost portion of the ring 334' to secure the sealing member 341' to the rest of the cartridge components. The skirt 398 and the flange 400 act as a cage to limit axial movement of the piston 304' within the cartridge 300'. The outer diameter of the skirt 398 is equal to the outer diameter 358 in the embodiment of FIGS. 13–15. The skirt 398 is intended to occupy space occupied by the outermost portion of the ribs 356. Other than a modified outlet 382', a modified nut 388', and a modified control knob 376', the casting 30 and the receptacle 378 are unchanged. Accordingly, the cartridge 300' can be used in the receptacle 378 interchangeably with the cartridge 300. Operation of the cartridge 300' is identical in all essential respects with that of the cartridge 300. The most significant difference is the groove 396 which serves to vent the openings 366, 394, in a manner analogous to the vent hole 368.

Regardless of which embodiment of the invention is used in the faucet assembly 10, once fluid has been permitted to flow, it is sent to the spout adaptor 40 where it is directed upwardly into the projecting portion 50. Thereafter it is discharged through the spout 26. The invention contemplates a novel and improved technique for fabricating the spout 26. A thin-walled brass or copper tube 402 conforming generally to the shape of the finished spout is provided. A heavy brass formation 404 is secured to one end of the tube 402, typically by brazing. The formation 404 defines a passageway 406 at the lower end of which an externally threaded portion 408 is provided. The threaded portion 408 is adapted to receive an aerator 409.

The swivel mount 52 is secured to the other end of the tube 402. As with the formation 404, the mount 52 is a heavy brass formation capable of absorbing the various loads imposed upon the spout 26. Typically, the swivel mount 52 will be secured to the end of the tube 402 by brazing.

After the tube 402 and the formations 52, 404 have been assembled, a plastic shell 410 is disposed about the tube 402 and the formation 404. If desired, the shell 410 can be molded integrally about the tube 402 and the formation 404. An alternate technique for forming the shell 410 is to mold two mating halves which can be snapped together, fastened together with screws, or welded together ultrasonically. A hand grip 412 optionally may be attached to the underside of the shell 410.

As will be appreciated from the foregoing description, valves embodying principles of the present invention are extremely long-lived. The individual components of the cartridges 102, 200, 300, and 300' can be molded from inexpensive materials and can be assembled quite easily. The expense of the various cartridges is quite modest. Because the cartridges are secured in place only by a single nut, removal and replacement of a cartridge is accomplished with little difficulty. The components of the cartridges are sufficiently inexpensive that a malfunctioning valve cartridge can simply be disposed and replaced by a new cartridge. The construction of the cartridges is such that the need for a packing is obviated, and effective sealing is accomplished by means of inexpensive O-rings and washers.

In addition to the inexpensive nature of the valve, the sealing characteristics of the valve are quite favorable. In the preferred embodiment, gravity, fluid forces, and a vacuum always the urge the valve element toward a sealing position and contact between sealing elements is such that reliability is enhanced. It is impossible for valves according to the invention to wear out due to overtightening. In addition to the foregoing advantages, the spout according to the invention is far less expensive than conventional spouts, and yet no sacrifices have been made with respect to appearance or strength. The alternate attachment technique disclosed as part of the invention permits the entire faucet assembly to be secured to a mounting surface with minimum difficulty.

Although the invention has been described in its preferred form with a certain degree of particularity, it is understood that the present disclosure of the preferred embodiment has been made only by way of example and that various changes may be resorted to without departing from the true spirit and scope of the invention as hereinafter claimed. It is intended that the patent shall cover, by suitable expression in the appended claims, whatever features of patentable novelty exist in the invention disclosed.

What is claimed is:

1. A cartridge-type valve having a valve element movable toward and away from a valve seat, comprising:
    a housing, the housing having inlet and outlet openings for the admittance and discharge of fluid, respectively;
    a valve seat located adjacent the outlet opening;
    a piston movable axially within the housing, the piston having a cylindrical body portion, a sealing member at one end of the body portion engageable with the valve seat to effect a fluid-tight seal, a driven portion at the other end of the piston, cam followers projecting laterally outwardly from the body portion, and a plurality of radially extending ribs engageable with the inner surface of the housing, the ribs defining a space between the inner surface of the housing and the outer surface of the body portion through which fluid can flow;
    a drive member engageable with the driven portion of the piston, at least a portion of the drive member being disposed within the housing, movement of the drive member being such as to cause the piston to be moved axially within the housing, the drive member being in engagement with the piston with a non-cylindrical drive connection to apply rotational but no axial force to the piston;
    at least one cam surface included as part of the housing, the cam followers being engageable with the cam surface, the cam surface having a contour such that, upon rotation of the piston, the piston is moved axially within the housing, the cam surface and the cam followers being disengaged upon contact between the piston and the valve seat; and
    the inlet opening being positioned with respect to the piston and the piston being positioned with respect to the outlet opening such that the fluid always urges the piston toward engagement with the valve seat.

2. The valve of claim 1, wherein the drive member includes a body portion having a recess, the recess conforming generally to the shape of the driven portion of the piston, whereby the driven portion of the piston can move axially of the drive member, but rotation of the drive member causes the driven portion to rotate.

3. The valve of claim 2, wherein the recess includes at least one axially extending slot, the slot providing a space between the inner surface of the recess and the outer surface of the driven portion of the piston, the space thus created permitting fluid to flow axially of the piston and to bear against a piston part spaced from the valve seat, the piston part oriented such that the fluid pressure constantly urges the piston into engagement with the valve seat.

4. The valve of claim 2, wherein the drive member includes an axially extending channel formed on the inner surface of the recess, the channel permitting the piston to move readily axially with respect to the drive member.

5. The valve of claim 1, wherein the drive member includes a plurality of radially extending tabs and the housing includes a plurality of circumferentially extending slots, the tabs engageable with the slots upon assembly of the cartridge to permanently assemble the cartridge components.

6. The valve of claim 1, further comprising:
    (a) a radially extending ear projecting from the drive member; and,
    (b) a stop member included as part of the housing, the ear engageable with the stop member to limit rotational movement of the drive member and, hence, rotational movement of the piston.

7. The valve of claim 6, wherein the stop member is located circumferentially of the housing with respect to the cam surface such that rotational movement of the piston is stopped substantially immediately after the sealing member engages the valve seat and the cam surface and the cam follower are disengaged.

8. The valve of claim 1, further comprising:
    (a) first and second O-rings disposed in circumferentially extending grooves formed in the outer surface of the housing, the grooves being positioned at opposite ends of the housing; and
    (b) a third O-ring disposed in a circumferentially extending groove formed in the outer surface of the drive member, the third O-ring engageable with the inner surface of the housing.

9. The valve of claim 1, wherein the sealing member is comprised of an elastomeric substance, and the valve seat is comprised of a rigid plastic substance.

* * * * *